(12) United States Patent
Morton et al.

(10) Patent No.: US 8,023,899 B2
(45) Date of Patent: Sep. 20, 2011

(54) APPROACH FOR SELECTING COMMUNICATIONS CHANNELS IN COMMUNICATION SYSTEMS TO AVOID INTERFERENCE

(75) Inventors: John MacLean Morton, Austin, TX (US); Nils Bagge, Austin, TX (US); Kevin Cheng-Hsuan Yang, Austin, TX (US); Ben William Jones, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 295 days.

(21) Appl. No.: 12/433,664

(22) Filed: Apr. 30, 2009

(65) Prior Publication Data
US 2010/0279618 A1   Nov. 4, 2010

(51) Int. Cl.
H04B 15/00   (2006.01)
H04B 1/00   (2006.01)

(52) U.S. Cl. ....................... 455/63.1; 455/296
(58) Field of Classification Search ................. 455/63.1
See application file for complete search history.

(56) References Cited

U.S. PATENT DOCUMENTS

| | | |
|---|---|---|
| 2,292,387 A | 8/1942 | Markey |
| 4,328,581 A | 5/1982 | Harmon et al. |
| 4,716,573 A | 12/1987 | Bergstrom et al. |
| 5,079,768 A | 1/1992 | Flammer |
| 5,323,447 A | 6/1994 | Gillis et al. |
| 5,361,401 A | 11/1994 | Pirillo |
| 5,377,222 A | 12/1994 | Sanderford, Jr. |
| 5,394,433 A | 2/1995 | Bantz et al. |
| 5,418,839 A | 5/1995 | Knuth et al. |
| 5,448,593 A | 9/1995 | Hill |
| 5,515,369 A | 5/1996 | Flammer, III et al. |
| 5,541,954 A | 7/1996 | Emi |
| 5,737,359 A | 4/1998 | Koivu |
| 5,809,059 A | 9/1998 | Souissi et al. |
| 5,848,095 A | 12/1998 | Deutsch |
| 5,933,420 A | 8/1999 | Jaszewski et al. |

(Continued)

FOREIGN PATENT DOCUMENTS

JP   HEI 10-107693   9/1996

OTHER PUBLICATIONS

Bandspeed Inc., "Adaptive Frequency Hopping, a Non-collaborative Coexistence Mechanism" Project: IEEE P802.15 Working Group for Wireless Personal Area Networks (WPANs), Dated May 16, 2001, 25 pages.

(Continued)

Primary Examiner — Hai L Nguyen
(74) Attorney, Agent, or Firm — Hickman Palermo Truong & Becker LLP; Edward A. Becker

(57) ABSTRACT

An approach for selecting communications channels to be used by a communication system includes evaluating for the presence of one or more signals both a particular communications channel currently being used by the communication system and one or more other communications channels. For the particular communications channel currently being used by the communication system, signals that use a different communications protocol than the communication system are evaluated. For the one or more other communications channels, both signals that use the same communications protocol as the communication system and signals that use a different communications protocol than the communication system are evaluated. The approach may include the use of metrics and classification of device types to determine one or more communications channels to be used by the communication system.

17 Claims, 5 Drawing Sheets

U.S. PATENT DOCUMENTS

| | | | |
|---|---|---|---|
| 5,937,002 | A | 8/1999 | Anderson et al. |
| 5,956,642 | A | 9/1999 | Larsson et al. |
| 6,052,594 | A | 4/2000 | Chuang et al. |
| 6,115,407 | A | 9/2000 | Gendel et al. |
| 6,115,408 | A | 9/2000 | Gendel et al. |
| 6,118,805 | A | 9/2000 | Bergstrom et al. |
| 6,122,309 | A | 9/2000 | Bergstrom et al. |
| 6,131,013 | A | 10/2000 | Bergstrom et al. |
| 6,272,353 | B1 | 8/2001 | Dicker et al. |
| 6,370,356 | B2 | 4/2002 | Duplessis et al. |
| 6,389,000 | B1 | 5/2002 | Jou |
| 6,418,317 | B1 | 7/2002 | Cuffaro et al. |
| 6,480,721 | B1 | 11/2002 | Sydon et al. |
| 6,487,392 | B1 | 11/2002 | Sonetaka |
| 6,577,611 | B1 | 6/2003 | Tat et al. |
| 6,694,141 | B1 | 2/2004 | Pulkkinen et al. |
| 6,760,319 | B1 | 7/2004 | Gerten et al. |
| 6,965,590 | B1 | 11/2005 | Schmidl et al. |
| 7,050,402 | B2 | 5/2006 | Schmidl et al. |
| 7,050,479 | B1 | 5/2006 | Kim |
| 7,079,568 | B1 | 7/2006 | Boetzel et al. |
| 7,257,376 | B2 * | 8/2007 | Reudink ............... 455/63.1 |
| 7,280,580 | B1 | 10/2007 | Haartsen |
| 7,440,484 | B2 | 10/2008 | Schmidl et al. |
| 7,680,455 | B2 * | 3/2010 | Moorti et al. ............. 455/63.1 |
| 7,792,536 | B2 * | 9/2010 | Yoon ....................... 455/501 |

OTHER PUBLICATIONS

Batra et al., "Proposal for Intelligent BT Frequency Hopping for Enchanced Coexistence", Project: IEEE P802.15 Working Group for Wireless Personal Area Networks (WPANs), Dated Jan. 15, 2001, 13 pages.

Bluetooth, "Bluetooth Technology: The True Hollywood Story", Internet website, http://www.bluetooth.com/English/Press/Pages/PressReleasesDetail.aspx?ID=30, last visited Apr. 13, 2010, 1 page.

Bluetooth, "Bluetooth Specification, 4.5 Payload Format", Version 1.0B, Dated Nov. 29, 1999, 7 pages.

Braun, Hans-Joachin, "Advanced Weaponry of the Starts", American Heritage of Invention & Technology Magazine, vol. 12 No. 4, 1997, 9 pages.

Chen et al., "Selective Hopping for Hit Avoidance", Project: IEEE P802.15 Working Group for Wireless Personal Area Networks (WPANs), Integrated Programmable Communications, Inc., Dated Jan. 15, 2001, 17 pages.

Gan et al., "Adaptive Frequency Hopping Ad-hoc Group Update" Bandspeed Inc., Project: IEEE P802.15 Working Group for Wireless Personal Area Networks (WPANs), Dates May 16, 2001, 14 pages.

Gan et al., "Adaptive Frequency Hopping, Implementation Proposals for IEEE", Bandspeed Ltd., Dated Nov. 2000, 28 pages.

Gan et al., "Adaptive Frequency Hopping, a Non-collaborative Coexistence Mechanism", Project: IEEE P802.15 Working Group for Wireless Personal Area Networks (WPANs), Bandspeed Inc., Dated Mar. 12, 2001, 40 pages.

Gan et al., "Fundamentals of Adaptive Frequency Hopping", Project: IEEE P802.15 Working Group for Wireless Personal Area Networks (WPANs), Bandspeed Inc., Dated Mar. 27, 2001, 4 pages.

Hills, "Terrestrial Wireless Networks", Scientific American Magazine, Dated Apr. 1998, 9 pages.

Homerf, "Interference Immunity of 2.4 GHz Wireless LANs", Dated Jan. 8, 2001, 10 pages.

Homerf, "HomeRF Specification HomeRF", Revision 2.01, Dated Jul. 1, 2002, 526 pages.

Hughes et al, "Spread Spectrum Radio", Scientific American Magazine, vol. 278, No. 4, Dated Apr. 1998, 6 pages.

IEEE, "Letter to Coexistence Mechanism Submitters", IEEE P802.15 Working Group for Wireless Personal Area Networks (WPANs), Dated Jan. 29, 2001, 5 pages.

IEEE, "Non-Collaborative AFH Mechanism", IEEE P802.15 Working Group for Wireless Personal Area Networks (WPANs), Dated Jun. 15, 2001, 4 pages.

IEEE, "Adaptive Frequency Hopping Ad-Hoc Group Update", IEEE P802.15 Working Group for Wireless Personal Area Networks (WPANs), Dates May 10, 2001, 15 pages.

Kostic et al., "Dynamic Frequency Hopping in Wireless Cellular Stystems Simulations of Full-Replacement and Reduced-Overhead Methods", Dated 1999, 5 pages.

Sapozhnykov et al., "Adaptive Frequency Hopping — Instant Channel Replacement: Simulation results", Project: IEEE P802.15 Working Group for Wireless Personal Area Networks (WPANs), Dated Oct. 3, 2001, 9 pages.

Bluetooth, "Specification of the Bluetooth System" Specification vol. 1, Dated Dec. 1, 1999, 4 pages.

Wenner, "Hedy Lamarr: Not Just a Pretty Face", Internet website Scientific American, http://www.scientificamerican.com/article.cfm?id=hedy-lamarr-not-just-a-pr, Dated Jun. 3, 2008, 3 pages.

Zander, "Adaptive Frequency Hopping in HF Communications", IEE Proc-Commun., vol. 142, No. 2, Dated Apr. 2, 1995, 99 pages.

United States District Court for the Western District of Texas Austin Division, *Joint Invalidity Contentions, Bandspeed, Inc. vs. Sony Electronics Inc. and Cambridge Silicon Radio Limited*, Civil Action No. A-09-CA-593-LY, 24 pages, dated Jul. 16, 2010.

Defendants Joint Invalidity Contentions, Exhibit A, *Bandspeed, Inc. v. Sony Electronics Inc.*, No. A-09-CA-593-LY, U.S. Patent No. 5,323, 447, Filed Nov. 1, 1991 to Gillis et al., 137 pages.

Defendants Joint Invalidity Contentions, Exhibit A2, *Bandspeed, Inc. v. Sony Electronics Inc.*, No. A-09-CA-593-LY, U.S. Patent No. 5,323, 447, Filed Nov. 1, 1991 to Gillis et al., 70 pages.

Defendants Joint Invalidity Contentions, Exhibit B1, *Bandspeed, Inc. v. Sony Electronics Inc.*, No. A-09-CA-593-LY, U.S. Patent No. 7,440,484 filed Apr. 19, 2001 to Schmidl et al., 79 pages.

Defendants Joint Invalidity Contentions, Exhibit B2, *Bandspeed, Inc. v. Sony Electronics Inc.*, No. A-09-CA-593-LY, U.S. Patent No. 7,440,484 filed Apr. 19, 2001 to Schmidl et al., 67 pages.

Defendants Joint Invalidity Contentions, Exhibit C1, *Bandspeed, Inc. v. Sony Electronics Inc.*, No. A-09-CA-593-LY, U.S. Patent No. 6,272,353 filed Aug. 20, 1999 to Dicker et al.,122 pages.

Defendants Joint Invalidity Contentions, Exhibit C2, *Bandspeed, Inc. v. Sony Electronics Inc.*, No. A-09-CA-593-LY, US Pat. 6,272,353 filed Aug. 20, 1999 to Dicker et al., 74 pages.

Defendants Joint Invalidity Contentions, Exhibit D1, *Bandspeed, Inc. v. Sony Electronics Inc.*, No. A-09-CA-593-LY, US Pat. 6,760,319 filed Jul. 5, 2000 to Gerten et al., 72 pages.

Defendants Joint Invalidity Contentions, Exhibit D2, *Bandspeed, Inc. v. Sony Electronics Inc.*, No. A-09-CA-593-LY, US. Pat. 6,760,319 filed Jul. 5, 2000 to Gerten et al., 32 pages.

Defendants Joint Invalidity Contentions, Exhibit E1, *Bandspeed, Inc. v. Sony Electronics Inc.*, No. A-09-CA-593-LY, US Pat. 6,115,407, filed Apr. 3, 1998 to Gendel et al., 104 pages.

Defendants Joint Invalidity Contentions, Exhibit E2, *Bandspeed, Inc. v. Sony Electronics Inc.*, No. A-09-CA-593-LY, US Pat. 6,115,407, filed Apr. 3, 1998 to Gendel et al., 68 pages.

Defendants Joint Invalidity Contentions, Exhibit F1, *Bandspeed, Inc. v. Sony Electronics Inc.*, No. A-09-CA-593-LY, US Pat. 5,937,002 filed Jun. 13, 1995 to Andersson et al., 152 pages.

Defendants Joint Invalidity Contentions, Exhibit F2, *Bandspeed, Inc. v. Sony Electronics Inc.*, No. A-09-CA-593-LY, US Pat. 5,937,002 filed Jun. 13, 1995 to Andersson et al., 86 pages.

Defendants Joint Invalidity Contentions, Exhibit G1, *Bandspeed, Inc. v. Sony Electronics Inc.*, No. A-09-CA-593-LY, Japanese No. 10-107693, filed Sep. 30, 1996 to Hei, 66 pages.

Defendants Joint Invalidity Contentions, Exhibit G2, *Bandspeed, Inc. v. Sony Electronics Inc.*, No. A-09-CA-593-LY, Japanese No. 10-107693, filed Sep. 30, 1996 to Hei, 34 pages.

Defendants Joint Invalidity Contentions, Exhibit H1, *Bandspeed, Inc. v. Sony Electronics Inc.*, No. A-09-CA-593-LY, US Pat. 7,050,479, filed May 12, 2000 to Kim, 74 pages.

Defendants Joint Invalidity Contentions, Exhibit H2, *Bandspeed, Inc. v. Sony Electronics Inc.*, No. A-09-CA-593-LY, US Pat. 7,050,479, filed May 12, 2000 to Kim, 32 pages.

Defendants Joint Invalidity Contentions, Exhibit I1, *Bandspeed, Inc. v. Sony Electronics Inc.*, No. A-09-CA-593-LY, US Pat. 5,737,359 filed May 10, 1995 to Koivu, 78 pages.

Defendants Joint Invalidity Contentions, Exhibit I2, *Bandspeed, Inc. v. Sony Electronics Inc.*, No. A-09-CA-593-LY, US Pat. 5,737,359 filed Apr. 7, 1998 to Koivu, 44 pages.

Defendants Joint Invalidity Contentions, Exhibit J1, *Bandspeed, Inc. v. Sony Electronics Inc.*, No. A-09-CA-593-LY, US Pat. 7,280,580, filed Oct. 15, 1999 to Haartsen, 62 pages.

Defendants Joint Invalidity Contentions, Exhibit J2, *Bandspeed, Inc. v. Sony Electronics Inc.*, No. A-09-CA-593-LY, US Pat. 7,280,580, filed Oct. 15, 1999 to Haartsen, 26 pages.

Defendants Joint Invalidity Contentions, Exhibit K1, *Bandspeed, Inc. v. Sony Electronics Inc.*, No. A-09-CA-593-LY, US Pat. 7,079,568 filed May 26, 2000 (priority) to Boetzel et al., 43 pages.

Defendants Joint Invalidity Contentions, Exhibit K2, *Bandspeed, Inc. v. Sony Electronics Inc.*, No. A-09-CA-593-LY, US Pat. 7,079,568 filed May 26, 2000 (priority) to Boetzel et al., 20 pages.

Defendants Joint Invalidity Contentions, Exhibit L1, *Bandspeed, Inc. v. Sony Electronics Inc.*, No. A-09-CA-593-LY, US Pat. 4,716,573 filed Nov. 8, 1995 to Bergstrom et al., 42 pages.

Defendants Joint Invalidity Contentions, Exhibit L2, *Bandspeed, Inc. v. Sony Electronics Inc.*, No. A-09-CA-593-LY, US Pat. 4,716,573 filed Nov. 8, 1995 to Bergstrom et al., 20 pages.

Defendants Joint Invalidity Contentions, Exhibit M, *Bandspeed, Inc. v. Sony Electronics Inc.*, No. A-09-CA-593-LY, US Pat. 5,848,095 filed May 17, 1996 to Deutsch, 30 pages.

Defendants Joint Invalidity Contentions, Exhibit N, *Bandspeed, Inc. v. Sony Electronics Inc.*, No. A-09-CA-593-LY, Specification of the Bluetooth System, Specification vol. 1.0b, Dec. 1, 1999, 2 pages.

Defendants Joint Invalidity Contentions, Exhibit O, *Banspeed, Inc. v. Sony Electronics Inc.*, No. A-09-CA-593-LY, US Pat. 6,965,590 filed Jul. 7, 2000 to Schmidl et al., 10 pages.

Defendants Joint Invalidity Contentions, Exhibit P, *Bandspeed, Inc. v. Sony Electronics Inc.*, No. A-09-CA-593-LY, Kistic, et al., "Dynamic Frequency Hopping in Wireless Cellular Systems-Simulations of Full Replacement and Reduced Overhead Methods", IEEE Published May 1999, 12 pages.

Defendants Joint Invalidity Contentions, Exhibit Q, *Bandspeed, Inc. v. Sony Electronics Inc.*, No. A-09-CA-593-LY, US Pat. 5,956,642 filed Nov. 25, 1996 to Larsson et al., 10 pages.

Defendants Joint Invalidity Contentions, Exhibit R, *Bandspeed, Inc. v. Sony Electronics Inc.*, No. A-09-CA-593-LY, US Pat. 6,418,317 filed Dec. 1, 1999 to Cuffaro et al, 5 pages..

Defendants Joint Invalidity Contentions, Exhibit S, *Bandspeed, Inc. v. Sony Electronics Inc.*, No. A-09-CA-593-LY, US Pat. 6,052,594 filed Apr. 30, 1997 to Chuang et al., 4 pages.

Defendants Joint Invalidity Contentions, Exhibit T, *Bandspeed, Inc. v. Sony Electronics Inc.*, No. A-09-CA-593-LY, US Pat. 6,370,356 filed Oct. 19, 1998 to Duplessis et al., 2 pages.

Defendants Joint Invalidity Contentions, Exhibit U, *Bandspeed, Inc. v. Sony Electronics Inc.*, No. A-09-CA-593-LY, US Pat. 6,487,392 filed Dec. 6, 1999 to Sonetaka, 6 pages.

\* cited by examiner

APPROACH FOR SELECTING COMMUNICATIONS CHANNELS IN COMMUNICATION SYSTEMS TO AVOID INTERFERENCE

FIELD OF THE INVENTION

This invention relates generally to communication systems.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

For a wireless communication system to achieve its maximum throughput and link quality the impact of outside radio frequency (RF) interference on the communication link must be minimized. Interference occurs when devices other than those used in the communication system emit energy in the same RF spectrum that the communication system uses.

Link performance of a wireless communication system can also be degraded by interference from devices that use the same protocol as the communication system but do not communicate with the communication system. When multiple devices operate in the same communications channel they must share the bandwidth of the communications channel and therefore only obtain a fraction of the throughput they could achieve if they were operating alone in the communications channel.

Interference is common when a wireless communication system operates in an unlicensed band where several other wireless devices are allowed to communicate in the same spectrum. For example, an 802.11b/g communication system operates in the 2.4-2.5 GHz Industrial, Scientific, and Medical (ISM) radio band. Other consumer devices such as microwave ovens, cordless phones, and Bluetooth devices are also permitted to operate in this band. If one of these devices emits a signal using the same frequency spectrum and at the same time as the 802.11b/g communication system, then the throughput and link quality achieved by the communication system can be significantly reduced.

In a multi-channel communication system where the communication system has the ability to operate on different channels, the best way to mitigate the interference problem is to detect the interference and avoid it by switching to another communications channel that has less interference or ideally, no interference. This is typically accomplished by performing measurements on a set of available communications channels and selecting a particular communications channel that is determined to have the least amount of current activity. One problem with this approach is that it does not account for dynamic noise environments or situations where a mobile device moves into a different noise environment. Another approach is to employ frequency hopping on a set of "good" channels, i.e., communications channels that are known to have little or no interference as of the last time that measurements were taken. Using frequency hopping over multiple channels can be a better solution than using a single communication channel because it reduces the likelihood of interference completely blocking communications. Frequency hopping systems, however, may be more difficult to implement, less efficient in bandwidth utilization and are still adversely affected by dynamic noise environments and situations where a mobile device moves into a different noise environment.

In view of the foregoing, an approach for selecting communications channels in communication systems to avoid interference that does not suffer from the limitations of prior approaches is highly desirable.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. ARCHITECTURE FOR SELECTING COMMUNICATIONS CHANNELS
    III. USING METRICS TO MAKE CHANNEL CHANGE DECISIONS
    IV. USING DEVICE TYPES TO MAKE CHANNEL CHANGE DECISIONS
    V. IMPLEMENTATION MECHANISMS, ALTERNATIVES AND EXTENSIONS

I. Overview

An approach is provided for selecting communications channels to be used by a communication system, for example, to avoid interference. According to the approach, both a particular communications channel currently being used by the communication system and one or more other communications channels are evaluated for the presence of one or more signals. For the particular communications channel currently being used by the communication system, signals that use a different communications protocol than the communication system, or signals from non-communications devices, for example microwave ovens, are evaluated. For the one or more other communications channels, both signals that use the same communications protocol as the communication system and signals that use a different communications protocol than the communication system are evaluated. The evaluation of the signals may include determining metrics, for example duty factors, to characterize the signals. The metrics may reflect the presence of one or more signals on communications channels over different periods of time. The metrics may also reflect different weightings applied for signals that use the same communications protocol as the communication system versus signals that use a different communications protocol than the communication system. The signals on the one or more other communications channels that use a different communications protocol than the communication system may also classified by device type. The metrics and the classification of the device type are used to determine a communications channel to be used by the communication system. The approach described herein is very useful in managing the communications channels used by a communication system, for example to avoid interference.

II. Architecture for Selecting Communications Channels

Figure 1:
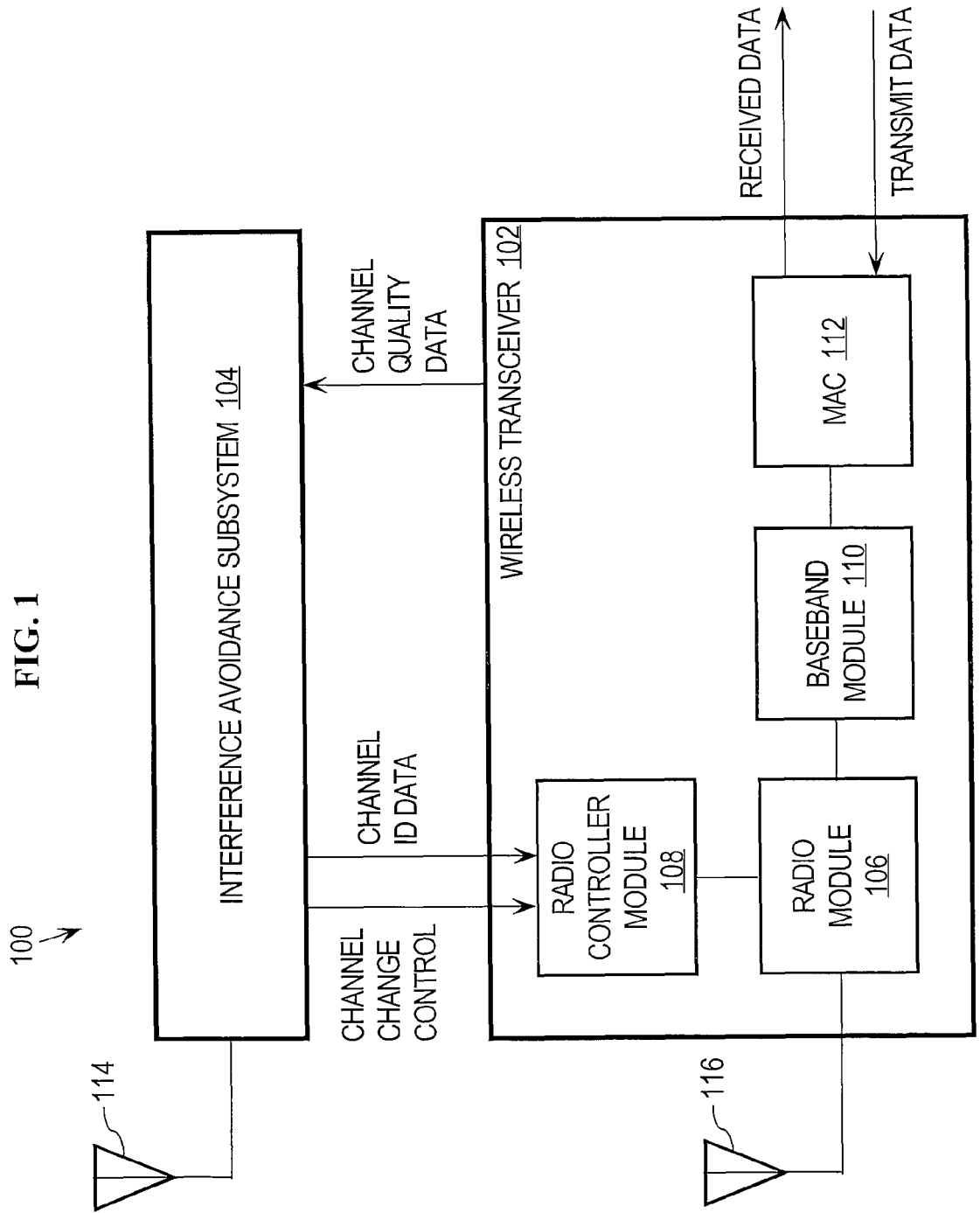
FIG. 1 is a block diagram that depicts an arrangement for selecting communications channels.

FIG. 1 is a block diagram that depicts an arrangement 100 for selecting communications channels according to one embodiment of the invention. Arrangement 100 includes a wireless transceiver 102 and an interference avoidance subsystem 104. Wireless transceiver 102 includes a radio module 106, a radio controller module 108, a baseband module 110, and a MAC 112. Interference avoidance subsystem 104 and wireless transceiver 102 each include antenna arrangements, 114, 116, respectively, for receiving and transmitting signals.

Interference avoidance subsystem 104 is configured to monitor a plurality of communications channels in parallel with the operation of wireless transceiver 102. Interference avoidance subsystem 104 also receives from wireless transceiver 102 channel quality data that indicates the quality of the communications channel(s) currently being used by wireless transceiver 102. As described in more detail hereinafter, interference avoidance subsystem 104 determines whether wireless transceiver 102 should continue to use the current communications channel or change to a different communications channel. If so, then as depicted in FIG. 1, interference avoidance subsystem 104 signals a channel change via a channel change control signal and indicates one or more new communications channels via channel identification data. Wireless transceiver 102 and interference avoidance subsystem 104 may exchange various other signals and data, depending upon a particular implementation, and are not limited to exchanging only the example signals and data depicted in FIG. 1. Furthermore, wireless transceiver 102 and its constituent elements and interference avoidance subsystem 104 are depicted in FIG. 1 as separate elements for explanation purposes only and the functionality of these elements may be implemented as a single element or any combination of multiple elements, depending upon a particular implementation.

Figure 2:
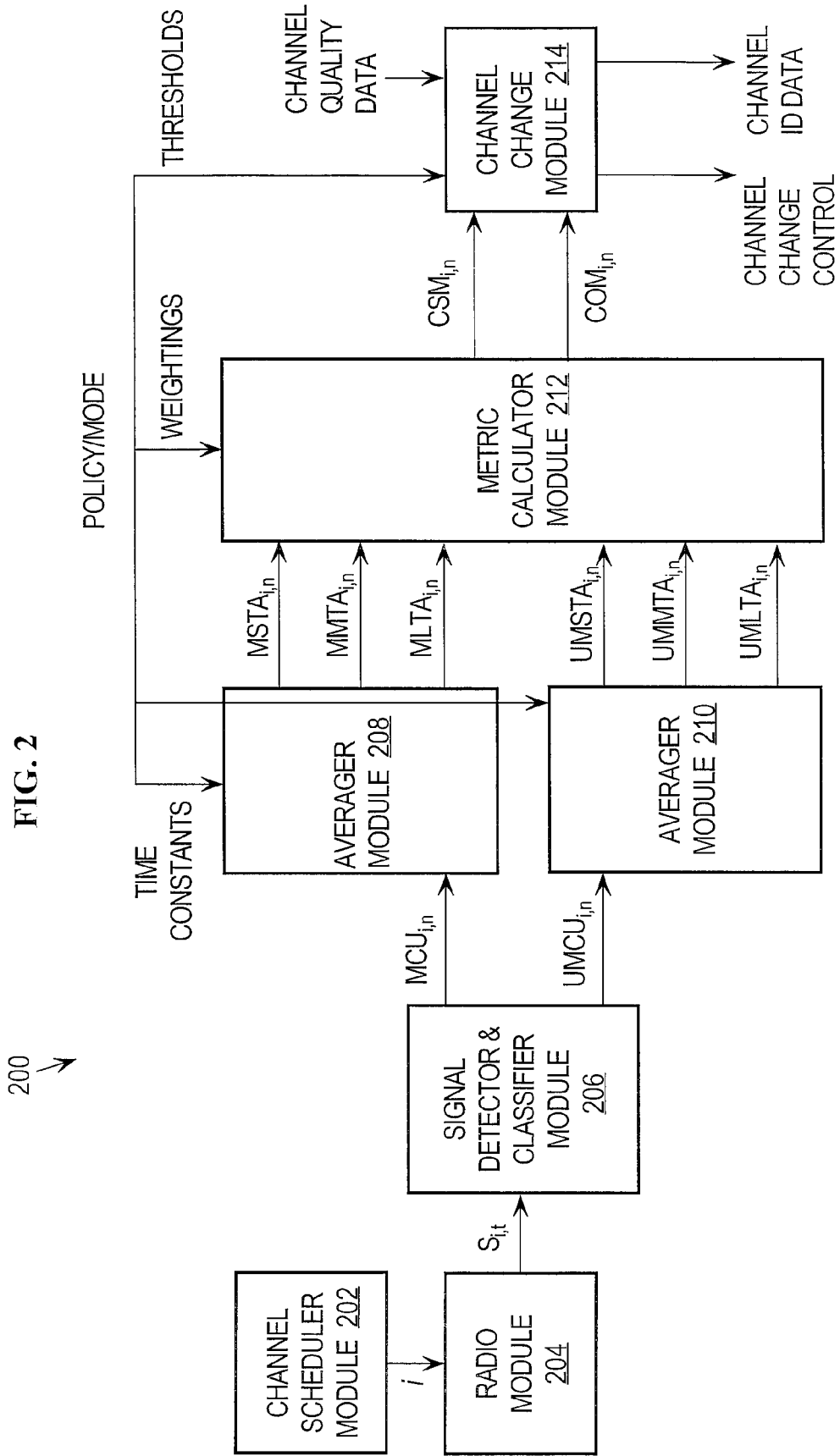
FIG. 2 is a block diagram that depicts an example arrangement of elements for implementing an interference avoidance subsystem.

FIG. 2 is a block diagram that depicts an example arrangement 200 of elements for implementing interference avoidance subsystem 104. Arrangement 200 includes a channel schedule module 202, a radio module 204, a signal detector & classifier module 206, averager modules 208, 210, a metric calculator module 212 and a channel change module 214. The elements of arrangement 200 may be implemented using hardware elements, computer software elements, or any combination of computer hardware and software elements. Furthermore, arrangement 200 may include fewer or more elements than depicted in FIG. 2, depending upon a particular implementation. In FIG. 2, the variables i and n represent a channel number and sample number, respectively.

Channel schedule module 202 provides a channel selection signal to a radio module 204 that indicates a particular communications channel i to be monitored. Thus, channel schedule module 202 may cause radio module 204 to cycle through a set of communications channels, dwelling on each communications channel for a specified amount of time. Alternatively, multiple communications channels may be monitored simultaneously and/or spectrum analysis employed if interference avoidance subsystem 104 has sufficient bandwidth to evaluate multiple channels simultaneously.

Radio module 204 provides data ($S_{i,t}$) to the signal detector & classifier module 206 that analyzes the data ($S_{i,t}$) and determines whether any signals are present on the communications channels monitored by radio module 204. Signal detector & classifier module 206 is also configured to determine whether detected signals are using the same communications protocol used by the communication system, e.g., wireless transceiver 102, or whether a different communications protocol is being used. Various matching algorithms and/or spectrum analysis may be used to determine whether a detected signal is using the same communications protocol as the communication system and the invention is not limited to any particular matching algorithm.

According to one embodiment of the invention, signal detector & classifier module 206 generates output data that indicates the utilization of communications channels by signals that are using the same communications protocol as the communication system and the utilization of the communications channels by signals that are using a different communications protocol than the communication system. The output data may also reflect signals generated by interfering non-communications devices. As depicted in FIG. 2, signal detector & classifier module 206 generates matched channel utilization (MCU) data and unmatched channel utilization (UMCU) data. The MCU data indicates the utilization of the communications channels by signals that are using the same communications protocol as the communication system. The UMCU data indicates the utilization of the communications channels by signals that are using a different communications protocol than the communication system. For example, suppose that wireless transceiver 102 is currently configured to use the 802.11 b/g protocol. The MCU data indicates how much the communications channels are utilized by 802.11 b/g signals. The UMCU data indicates how much the communications channels are utilized by non 802.11 b/g signals, e.g., signals from microwave or Bluetooth devices.

According to one embodiment of the invention, the MCU and UMCU data specifies a duty factor that indicates, for a particular channel and sample, a percentage of time that a signal was active over the last measurement period. For example, suppose that signal detector & classifier module 206 determines that a signal using the same communications protocol as wireless transceiver 102 was present on a particular communications channel for 0.1 seconds during a measurement period of one second. The MCU data for the particular communications channel would be 0.1 on a scale of 0 to 1, representing a duty factor of 10%. This example is provided for explanation purposes only and the particular values used may vary depending upon a particular implementation.

The MCU and UMCU data generated by signal detector & classifier module 206 is received and processed by averager modules 208, 210, respectively. Averager module 208 processes the MCU data over time and computes short-term, medium-term and long-term averages for the data samples. These averages are depicted in FIG. 2 as $MSTA_{i,n}$, $MSTA_{i,n}$ and $MSTA_{i,n}$, respectively. Similarly, averager module 210 processes the UMCU data over time and computes short-term, medium-term and long-term averages for the data samples. These averages are depicted in FIG. 2 as $UMSTA_{i,n}$, $UMSTA_{i,n}$ and $UMSTA_{i,n}$, respectively.

The amount of time (and number of data samples) use to calculate the short-term, medium-term and long-term averages may vary, depending upon a wide variety of factors and implementations. Example factors include, without limitation, the expected types of signal sources, the expected number of signals, the expected duration and/or frequency of signals, other characteristics of signals, as well as available computational and storage resources. For example, an amount of time may be selected to ensure that certain types of signals are detected and/or to sufficiently characterize device types associated with detected signals. As one example, the short-term averages may represent several seconds, the medium-term averages may represent tens of seconds and the long-term averages may represent one or more minutes. The medium-term averages may be calculated from multiple short-term averages and the long-term averages may be calculated from multiple short-term averages, multiple medium-term averages, or a combination of short-term averages and medium-term averages. Alternatively, the medium-term and long-term averages may be calculated directly based upon longer periods of time or a larger number of data samples.

Figure 3:
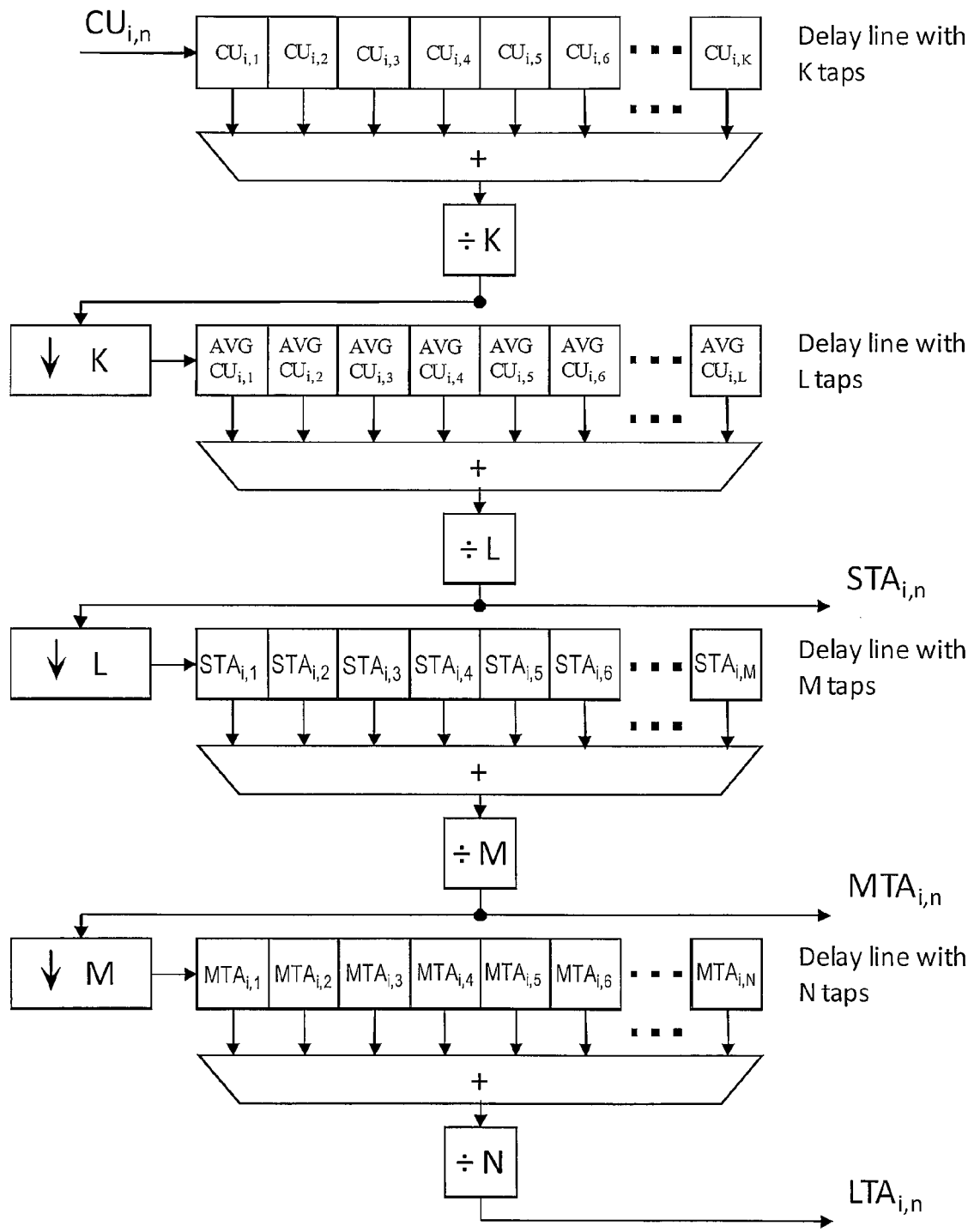
FIG. 3 depicts an example functional implementation of averager modules.

The implementation of averager modules 208, 210 may vary, depending upon the requirements of a particular application. FIG. 3 depicts an example functional implementation of averager modules 208, 210. Starting at the top of FIG. 3, K samples of channel utilization (CU) data, identified as $CU_{i,1}$, $CU_{i,2}$ through $CU_{iK}$, are averaged to obtain an average CU (AVGCU). L number of average CUs, identified as $AVGCU_{i,1}$, $AVGCU_{i,2}$ through $AVGCU_{i,L}$, are averaged to obtain a short-term average (STA). M number of short-term averages (STAs), identified as $STA_{i,1}$, $STA_{1,2}$ through $STA_{i,M}$, are averaged to obtain a medium-term average (MTA). N number of medium-term averages (MTAs), identified as $MTA_{i,1}$, $MTA_{i,2}$ through $MTA_{i,N}$, are averaged to obtain a long-term average (LTA). The CU data may be either MCU data or UMCU data. As an alternative, short-term, medium-term and long-term averages may be calculated directly from the CU data.

Returning to FIG. 2, metric calculator module 212 processes the short-term, medium-term and long-term channel utilization averages generated by averager modules 208, 210 and generates two channel utilization metrics, a channel switched metric (CSM) and a channel occupancy metric (COM). According to one embodiment of the invention, the CSM reflects signals that are both present on the communications channel(s) being used by the communication system and conform to a different communications protocol than the communications protocol being used by the communication system. The CSM therefore reflects "out of protocol" signals on the communications channel(s) being used by the communication system. Thus, only the unmatched channel utilization data needs to be used to determine the CSM, e.g., the $UMSTA_{i,n}$, $UMMTA_{i,n}$ and $UMLTA_{i,n}$ data. The COM reflects signals present on communications channels other than the communications channel(s) being used by the communication system. Furthermore, the COM reflects signals that are using the same communications protocol as the communication system or a different communications protocol than the communication system. The following two equations show how the values for the CSM and the COM may be calculated:

$$CSM_{i,n} = \alpha_0 UMSTA_{i,n} + \alpha_1 UMMTA_{i,n} + \alpha_2 UMLTA_{i,n}$$

$$COM_{i,n} = \beta_0 UMSTA_{i,n} + \beta_1 UMMTA_{i,n} + \beta_2 UMLTA_{i,n} + \beta_3 MSTA_{i,n} + \beta_4 MMTA_{i,n} + \beta_5 MLTA_{i,n}$$

The $\alpha_n$ and $\beta_n$ parameters represent weights that may be applied to the terms of the equations. The particular values of the weights may vary, depending upon a particular implementation. For example, in certain situations it may be valuable to give greater weight to long-term channel utilization data to ensure that signal sources that transmit infrequently are considered. As another example, for the calculation of the COM, it may be desirable to give greater weight to unmatched channel utilization data than matched channel utilization data on the basis that it may be more difficult for the communication system to coexist with devices that are using a different communications protocol than the communication system. Some communications protocols include provisions that allow multiple devices to coexist on the same set of communications channels. For example, some communications protocols require that devices use a carrier sense mechanism to ensure that a communications channels is not being used prior to transmission and/or that they use a collision reconciliation mechanism.

Weights may also be assigned in accordance with interference avoidance policies that may be applied in different situations. For example, an implementation may employ an "aggressive" policy a "normal" policy and a "conservative" policy. The names of these example policies, i.e., "aggressive," "normal," and "conservative" are merely labels selected to explain the differences between the policies. Any type of label may be used, depending upon a particular implementation.

The "aggressive" policy applies the greatest weights to the short-term channel utilization data. This may include, for example, giving little or no weight to the medium-term and long-term utilization data so that the metrics reflect primarily the short-term channel utilization data. The "aggressive" policy is useful in situations where it is desirable to change communications channels to avoid interference as soon as interference is detected. The tradeoff with this approach is that there are costs associated with making frequent channel changes and those costs will generally be incurred more often. For example, executing channel changes requires coordinating the changes with participating devices, which can increase network traffic and in some situations even cause a disruption in service. Also, there is no guarantee that the new channel utilization scheme will be better than the current channel utilization scheme.

The "normal" policy applies the greatest weights to the medium-term channel utilization data relative to the short-term and long-term channel utilization data. The short-term and long-term utilization data may be given little or no weight. The "normal" policy provides a balance between changing channels to avoid interference and incurring the costs of making those changes.

The "conservative" policy applies the greatest weights to the long-term channel utilization data. This may include, for example, giving little or no weight to the short-term and medium-term utilization data so that the metrics reflect primarily the long-term channel utilization data. The "conservative" policy is useful in situations where it is desirable to only change communications channels when potentially interfering signals are present for a longer period of time. For example, a wireless implementation may be designed to maximize throughput based upon using only non-overlapping channels. In this situation, the "conservative" policy is useful because changing channels may cause a less optimal channel mapping to be used, e.g., where some non-overlapping channels are used. Channel weights may be changed over time, depending upon a particular implementation.

According to one embodiment of the invention, an interference avoidance policy may also specify the number of taps that are used to calculate the short-term, medium-term and long-term average utilization data. This can help reduce the amount of computational resources that are consumed calculating the short-term, medium-term and long-term average channel utilization data. For example, if an "aggressive" interference avoidance policy is used that provides zero weighting for long-term channel utilization data, then there is no need to calculate long-term channel utilization data and the value of N taps depicted in FIG. 3 may be zero.

Returning to FIG. 2, channel change module 214 processes the CSM and COM data generated by metric calculator module 212 along with channel quality data that indicates the quality of the communications channel(s) currently being used by the communication system, i.e., wireless transceiver 102. Channel change module 214 determines, based upon this data, whether different communications channel(s) should be used and if so, which one(s). The channel change control is control data that indicates that different communications channel(s) should be used and channel ID data identifies one or more alternative communications channels.

III. Using Metrics to Make Channel Change Decisions

Figure 4:
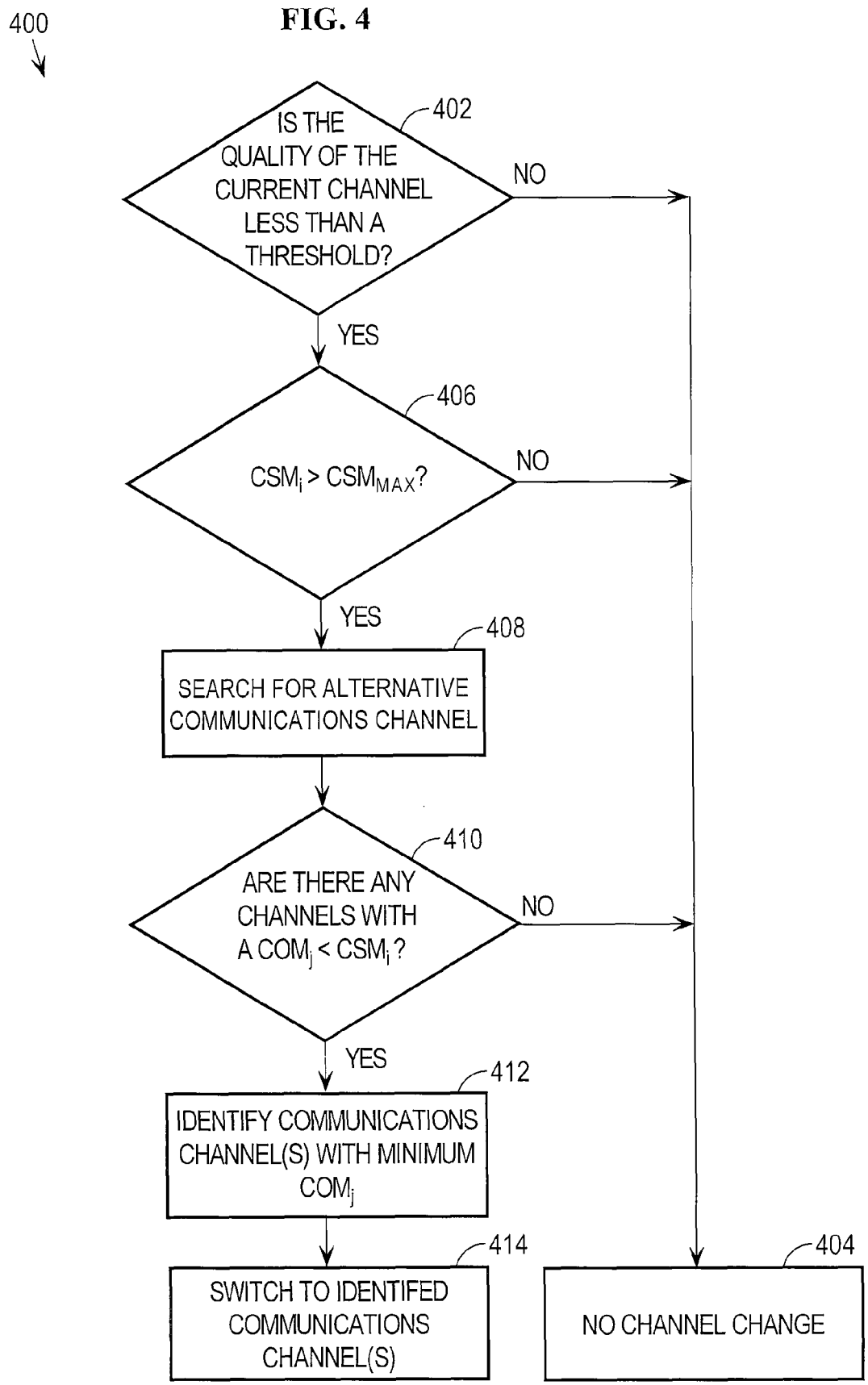
FIG. 4 is a flow diagram that depicts an approach for using a channel switch metric and channel occupancy metrics to make channel change decisions.

FIG. 4 is a flow diagram 400 that depicts an approach for using the aforementioned CSM and COM metrics to make channel change decisions. In step 402, a determination is made whether the quality of the current communications channel being used by the communication system is less than a specified threshold. For example, the channel quality data received by the channel change module 214 may be in the form of the CSM that indicates the amount of non-protocol usage of the communications channel currently being used by the communication system. Channel change module 214 compares the CSM to a specified threshold to make the determination in step 402. If the CSM is less than the specified threshold, then in step 404, the current communications channel being used by the communication system does not need to be changed because the quality of the current channel is sufficient.

If the CSM is greater than or equal to the specified threshold, then in step 406, a determination is made whether the CSM for the current communications channel ($CSM_i$) is greater than a specified maximum CSM ($CSM_{MAX}$). That is, whether the presence of one or more signals on the communications channel being used by the communication system that use a different communications protocol than the communications system exceeds the specified maximum. If not, then no channel change is made in step 404. If so, then this means that the presence, in the current communications channel, of signals that conform to a different communications protocol than the communication system, exceed an acceptable level and in step 408, a search is performed for an alternative communications channel.

In step 410, a determination is made whether there are any other communications channels available that have a COM less than the CSM of the current communications channels. Other communications channels with a COM less than the CSM of the current communications channel are candidate channels. If none exist, then no channel change is made in step 404 because there are no alternative communications that are deemed to be preferable to the communications channels currently being used by the communications system.

If there are other communications channels with a COM less than the CSM of the current communications channel, then in step 412, the candidate communications channel(s) having the lowest COM are selected for use. In step 414, the communication system switches to using the selected communications channels.

The approach is applicable to the communication system using any number of communications channels. For example, the communication system may be currently using a single communications channel that has degraded in quality over time and the aforementioned approach is used to select an alternative communications channel for the communication system to use. As another example, the communication system may currently be using a set of two or more communications channels and the aforementioned approach is used to select two or more alternative communications channels for the communication system to use. For example, the approach may be used to evaluate each communications channel from a set of communications channels being used with a frequency hopping protocol. Communications channels from the set of communications channels that are determined to not have sufficient quality are replaced with alternative communications channels. The approach may be used either continuously or periodically to manage the communications channels being used by a communication system.

Although the aforementioned approach has been described in the context of making a channel change when the quality of the current communications channel has degraded, the approach is not limited to this context. The approach may also be used to select one or more initial communications channels to be used by a communication system. For example, upon startup, one or more communications channels may be randomly designated as the current communications channels being used by the communication system. This may be done, for example, when there is no knowledge about the quality of the available communications channels. In situations where some information is available about the quality of the communications channels, then that information may be used to select the one or more communications channels to be designated as current communications channels to be used by the communication system. The approach may then be employed to evaluate the designated current communications channels and other alternative communications channels to determine the best set of one or more communications channels to be used by the communication system.

IV. Using Device Types to Make Channel Change Decisions

According to one embodiment of the invention, device types may be considered in making channel change decisions. This may include, for example, interference avoidance system 104 determining the types of devices generating signals on communications channels and then taking the device types into consideration when making channel change decisions. Certain types of devices may be known to transmit only intermittently and are therefore less likely to cause sufficient interference to require a change in communications channels. One nonlimiting example of this type of device is a microwave oven. Other types of devices may be known to transmit more regularly, or even continuously, and therefore are more likely to cause sufficient interference to require a change in communications channels. Nonlimiting examples of this type of device include game consoles and wireless video cameras. Device types may be considered in combination with the CSM, COM and LQM metrics. For example, if it is known that a detected signal is generated by a type of device that is a transient device, then the device type may be given a low weighting, relative to the CSM and COM metrics, so that the communications channels on which the signal is present are not completely eliminated from consideration for use, but are given a lower preference. Alternatively, if it is known that a detected signal is generated by a type of device that is known to transmit for long periods of time, then the communications channel(s) on which the signal is present may not be used. The determination of device types may be applied to signals that use the same communications protocol as the communication system, a different communications protocol, or both. According to one embodiment of the invention, only the signals that use a different communications protocol than the communication system are evaluated for device type under the assumption that it is easier for the communication system to coexist with devices using the same communications protocol as the communication system.

The determination of the type of device generating a signal may be made using a wide variety of algorithms, depending upon a particular implementation, and the approach described herein for selecting communications channels to avoid interference is not limited to any particular approach for determining a type of device that generated a signal. Example approaches include, without limitation, using energy detection and spectral analysis to characterize signals as being generated by a particular type of device.

V. Implementation Mechanisms, Alternatives and Extensions

The approach described herein for selecting communications channels to be used by a communication system is applicable to a wide variety of contexts. For example, the approach is applicable to any type of wired or wireless communication systems. Examples of wireless communication systems include, without limitation, personal communications networks, wireless networks, licensed and unlicensed bands, television bands, etc.

Figure 5:
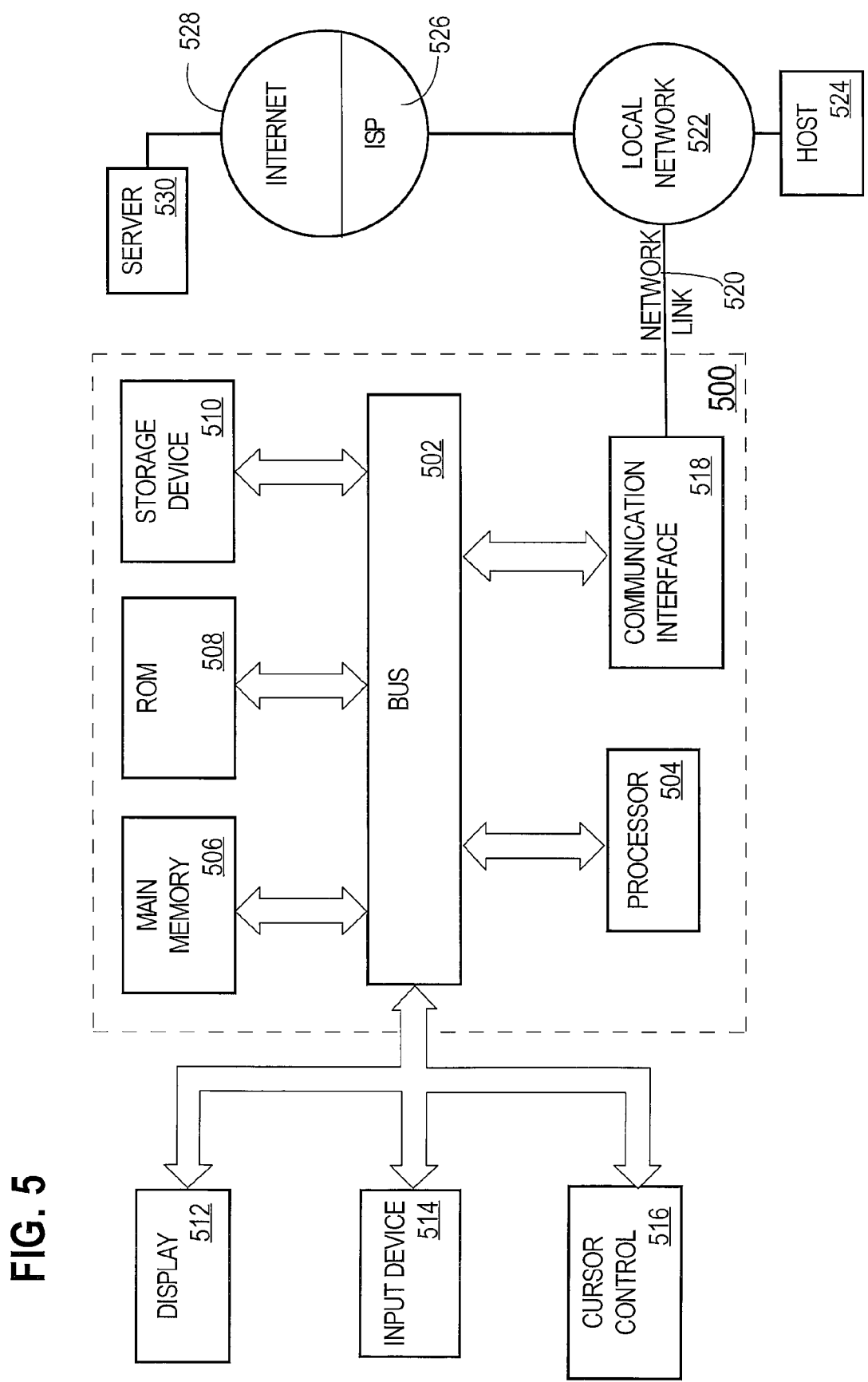
FIG. 5 is a block diagram of a computer system on which embodiments of the invention may be implemented.

The approach described herein for selecting communications channels to be used by a communication system may be implemented on any type of computing architecture or computing platform. For purposes of explanation, FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for selecting communications channels to be used by a communication system, the computer-implemented method comprising:
   for a particular communications channel being used by the communication system from a plurality of communications channels, determining a channel switch metric that indicates the presence of one or more signals on the particular communications channel that use a different communications protocol than a communications protocol used by the communication system;
   for one or more communications channels from the plurality of communications channels other than the particular communications channel:
      determining, for each of the one or more communications channels,
         a channel occupancy metric that indicates the presence of one or more signals on the communications channel that use the same communications protocol as the communications protocol used by the communication system or a different communications protocol, and
         a classification, by device type, of the one or more signals determined to be present on the communications channel that use a different communications protocol than the communications protocol used by the communication system;
   determining, based upon at least the channel switch metric and the channel occupancy metric and classification for each of the one or more communications channels, whether the communication system should use one or more alternative communications channels from the one or more communications channels instead of the particular communications channel; and
   if a determination is made that the communication system should use the one or more alternative communications channels from the one or more communications channels instead of the particular communications channel, then causing the communication system to use the one or more alternative communications channels.

2. A computer-implemented method for selecting communications channels to be used by a communication system, the computer-implemented method comprising:
   for a particular communications channel being used by the communication system from a plurality of communications channels, determining a presence of one or more signals on the particular communications channel that use a different communications protocol than a communications protocol used by the communication system;
   for one or more communications channels from the plurality of communications channels other than the particular communications channel:
      determining a presence of one or more signals on the one or more communications channels that use the same communications protocol as the communications protocol used by the communication system,
      determining a presence of one or more signals on the one or more communications channels that use a different communications protocol than the communications protocol used by the communication system, and
      classifying, by device type, the signals determined to be present on the one or more communications channels that use a different communications protocol than the communications protocol used by the communication system;
   determining, based upon at least:
      the presence of the signals on the particular communications channel that use a different communications protocol than the communications protocol used by the communication system,
      the presence of one or more signals on the one or more communications channels that use the same communications protocol as the communications protocol used by the communication system,
      the presence of one or more signals on the one or more communications channels that use a different communications protocol than the communications protocol used by the communication system,
      and the classification by device type of the one or more signals determined to be present on the one or more communications channels that use a different communications protocol than the communications protocol used by the communication system, whether the communication system should use an alternative communications channel from the one or more communications channels instead of the particular communications channel; and
   if a determination is made that the communication system should use the alternative communications channel from the one of the one or more communications channels instead of the particular communications channel, then causing the communication system to use the alternative communications channel.

3. The computer-implemented method of claim 2, wherein:
   determining the presence of one or more signals on the particular communications channel that use a different communications protocol than a communications protocol used by the communication system includes determining a first duty factor that indicates a percentage of a specified time that the signals were present on the particular communications channel that use a different communications protocol than a communications protocol used by the communication system,
   determining the presence of one or more signals on the one or more communications channels that use the same communications protocol as the communications protocol used by the communication system includes determining, for each of the one or more communications channels, a second duty factor that indicates a percentage of the specified time that the signals were present on the communications channel that use the same communications protocol as the communications protocol used by the communication system,
   determining the presence of one or more signals on the one or more communications channels that use a different communications protocol than the communications protocol used by the communication system includes determining, for each of the one or more communications channels, a third duty factor that indicates a percentage of the specified time that the signals were present on the communications channel that use a different communications protocol than the communications protocol used by the communication system, and determining, based upon at least:

the presence of the signals on the particular communications channel that use a different communications protocol than the communications protocol used by the communication system, the presence of one or more signals on the one or more communications channels that use the same communications protocol as the communications protocol used by the communication system, the presence of one or more signals on the one or more communications channels that use a different communications protocol than the communications protocol used by the communication system, and the classification by device type of the signals determined to be present on the one or more communications channels that use a different communications protocol than the communications protocol used by the communication system, whether the communication system should use an alternative communications channel from the one or more communications channels instead of the particular communications channel includes determining, based upon at least the first duty factor, the one or more second duty factors, the one or more third duty factors and the one or more classifications by device type of the signals determined to be present on the one or more communications channels that use a different communications protocol than the communications protocol used by the communication system, whether the communication system should use an alternative communications channel from the one or more communications channels instead of the particular communications channel.

4. The computer-implemented method of claim 2, wherein the specified time is determined by a designated interference avoidance policy.

5. The computer-implemented method of claim 2, wherein the different communications protocol than the communications protocol used by the communication system is a communications protocol from a plurality of known communications protocols.

6. The computer-implemented method of claim 2, wherein the different communications protocol than the communications protocol used by the communication system is a communications protocol from a plurality of known communications protocols.

7. The computer-implemented method of claim 2, wherein:
the computer-implemented method further comprises:
for the particular communications channel being used by the communication system, determining a first metric that represents the presence of the signals on the particular communications channel that use the different communications protocol than the communications protocol used by the communication system, for each of the one or more communications channels from the plurality of communications channels other than the particular communications channel, determining a second metric that represents both the presence of one or more signals on the communications channel that use the same communications protocol as the communications protocol used by the communication system and the presence of one or more signals on the communications channel that use a different communications protocol as the communications protocol used by the communication system, and the determining whether the communication system should use an alternative communications channel from the one or more communications channels instead of the particular communications channel includes comparing the first metric to each of the second metrics to determine whether the communication system should use one or more of the one or more communications channels instead of the particular communications channel.

8. The computer-implemented method of claim 7, wherein:
the second metric gives greater emphasis to the one or more signals on the communications channel that use a different communications protocol than the communication system relative to the one or more signals on the communications channel that use the same communications protocol as the communications protocol used by the communication system.

9. A computer-readable medium for selecting communications channels to be used by a communication system, the computer-readable medium storing instructions which, when processed by one or more processors, causes:

for a particular communications channel being used by the communication system from a plurality of communications channels, determining a channel switch metric that indicates the presence of one or more signals on the particular communications channel that use a different communications protocol than a communications protocol used by the communication system;

for one or more communications channels from the plurality of communications channels other than the particular communications channel:

determining, for each of the one or more communications channels, a channel occupancy metric that indicates the presence of one or more signals on the communications channel that use the same communications protocol as the communications protocol used by the communication system or a different communications protocol, and a classification, by device type, of the one or more signals determined to be present on the communications channel that use a different communications protocol than the communications protocol used by the communication system;

determining, based upon at least the channel switch metric and the channel occupancy metric and classification for each of the one or more communications channels, whether the communication system should use one or more alternative communications channels from the one or more communications channels instead of the particular communications channel; and if a determination is made that the communication system should use the one or more alternative communications channels from the one or more communications channels instead of the particular communications channel, then causing the communication system to use the one or more alternative communications channels.

10. A computer-readable medium for selecting communications channels to be used by a communication system, the computer-readable medium storing instructions which, when processed by one or more processors, causes:

for a particular communications channel being used by the communication system from a plurality of communications channels, determining a presence of one or more signals on the particular communications channel that use a different communications protocol than a communications protocol used by the communication system;

for one or more communications channels from the plurality of communications channels other than the particular communications channel:
    determining a presence of one or more signals on the one or more communications channels that use the same communications protocol as the communications protocol used by the communication system,
    determining a presence of one or more signals on the one or more communications channels that use a different communications protocol than the communications protocol used by the communication system, and
    classifying, by device type, the signals determined to be present on the one or more communications channels that use a different communications protocol than the communications protocol used by the communication system;
determining, based upon at least:
    the presence of the signals on the particular communications channel that use a different communications protocol than the communications protocol used by the communication system,
    the presence of one or more signals on the one or more communications channels that use the same communications protocol as the communications protocol used by the communication system,
    the presence of one or more signals on the one or more communications channels that use a different communications protocol than the communications protocol used by the communication system,
    and the classification by device type of the one or more signals determined to be present on the one or more communications channels that use a different communications protocol than the communications protocol used by the communication system, whether the communication system should use an alternative communications channel from the one or more communications channels instead of the particular communications channel; and
if a determination is made that the communication system should use the alternative communications channel from the one of the one or more communications channels instead of the particular communications channel, then causing the communication system to use the alternative communications channel.

11. The computer-readable medium of claim 10, wherein:
determining the presence of one or more signals on the particular communications channel that use a different communications protocol than a communications protocol used by the communication system includes determining a first duty factor that indicates a percentage of a specified time that the signals were present on the particular communications channel that use a different communications protocol than a communications protocol used by the communication system,
determining the presence of one or more signals on the one or more communications channels that use the same communications protocol as the communications protocol used by the communication system includes determining, for each of the one or more communications channels, a second duty factor that indicates a percentage of the specified time that the signals were present on the communications channel that use the same communications protocol as the communications protocol used by the communication system,
determining the presence of one or more signals on the one or more communications channels that use a different communications protocol than the communications protocol used by the communication system includes determining, for each of the one or more communications channels, a third duty factor that indicates a percentage of the specified time that the signals were present on the communications channel that use a different communications protocol than the communications protocol used by the communication system, and
determining, based upon at least:
    the presence of the signals on the particular communications channel that use a different communications protocol than the communications protocol used by the communication system,
    the presence of one or more signals on the one or more communications channels that use the same communications protocol as the communications protocol used by the communication system,
    the presence of one or more signals on the one or more communications channels that use a different communications protocol than the communications protocol used by the communication system,
    and the classification by device type of the signals determined to be present on the one or more communications channels that use a different communications protocol than the communications protocol used by the communication system, whether the communication system should use an alternative communications channel from the one or more communications channels instead of the particular communications channel includes
determining, based upon at least the first duty factor, the one or more second duty factors, the one or more third duty factors and the one or more classifications by device type of the signals determined to be present on the one or more communications channels that use a different communications protocol than the communications protocol used by the communication system, whether the communication system should use an alternative communications channel from the one or more communications channels instead of the particular communications channel.

12. The computer-readable medium of claim 10, wherein the specified time is determined by a designated interference avoidance policy.

13. The computer-readable medium of claim 10, wherein the different communications protocol than the communications protocol used by the communication system is a communications protocol from a plurality of known communications protocols.

14. The computer-readable medium of claim 10, wherein the different communications protocol than the communications protocol used by the communication system is a communications protocol from a plurality of known communications protocols.

15. The computer-readable medium of claim 10, wherein:
the computer-readable medium stores additional instructions which, when processed by the one or more processors, causes:
for the particular communications channel being used by the communication system, determining a first metric that represents the presence of the signals on the particular communications channel that use the different communications protocol than the communications protocol used by the communication system,
for each of the one or more communications channels from the plurality of communications channels other than the particular communications channel, determining a second metric that represents both the presence of one or more signals on the communications channel that use the same communications protocol as the communications protocol used by the communication system and the presence of one or more signals on the communications channel that use a different communications protocol as the communications protocol used by the communication system, and the determining whether the communication system should use an alternative communications channel from the one or more communications channels instead of the particular communications channel includes comparing the first metric to each of the second metrics to determine whether the communication system should use one or more of the one or more communications channels instead of the particular communications channel.

16. The computer-readable medium of claim 15, wherein: the second metric gives greater emphasis to the one or more signals on the communications channel that use a different communications protocol than the communication system relative to the one or more signals on the communications channel that use the same communications protocol as the communications protocol used by the communication system.

17. An apparatus for selecting communications channels to be used by a communication system, the apparatus comprising an interference avoidance subsystem configured to:
for a particular communications channel being used by the communication system from a plurality of communications channels, determine a channel switch metric that indicates the presence of one or more signals on the particular communications channel that use a different communications protocol than a communications protocol used by the communication system;
for one or more communications channels from the plurality of communications channels other than the particular communications channel:
determine, for each of the one or more communications channels,
a channel occupancy metric that indicates the presence of one or more signals on the communications channel that use the same communications protocol as the communications protocol used by the communication system or a different communications protocol, and
a classification, by device type, of the one or more signals determined to be present on the communications channel that use a different communications protocol than the communications protocol used by the communication system;
determine, based upon at least the channel switch metric and the channel occupancy metric and classification for each of the one or more communications channels, whether the communication system should use one or more alternative communications channels from the one or more communications channels instead of the particular communications channel; and
if a determination is made that the communication system should use the one or more alternative communications channels from the one or more communications channels instead of the particular communications channel, then causing the communication system to use the one or more alternative communications channels.

* * * * *